United States Patent [19]

Debande et al.

[11] 4,107,225

[45] Aug. 15, 1978

[54] HYDROGENATION PROCESS OF OLEFIN POLYMERS FOR PRODUCING WHITE OILS

[75] Inventors: Guy F. S. Debande, Watermael; Raymond N. M. Cahen, Etterbeek; Jacques F. J. Grootjans, Leefdael, all of Belgium

[73] Assignee: Labofina S.A., Brussels, Belgium

[21] Appl. No.: 777,908

[22] Filed: Mar. 15, 1977

[30] Foreign Application Priority Data

Mar. 16, 1976 [LU] Luxembourg .............................. 74571

[51] Int. Cl.$^2$ ................................................. C07C 5/14
[52] U.S. Cl. .................................................. 260/683.9
[58] Field of Search .......................... 260/683.9, 676 R; 208/255, 144, 216 PP, 89

[56] References Cited

U.S. PATENT DOCUMENTS

| | | | |
|---|---|---|---|
| 3,100,808 | 8/1963 | Dyer ................................. | 260/683.9 |
| 3,149,178 | 9/1964 | Hamilton et al. ................. | 260/683.9 |
| 3,620,966 | 11/1971 | Haney et al. ...................... | 208/144 |
| 3,737,477 | 6/1973 | Stearns et al. .................... | 260/683.9 |
| 3,793,388 | 2/1974 | Pitzer ................................ | 260/683.9 |
| 3,884,988 | 5/1975 | Girotti et al. ..................... | 260/683.9 |
| 3,943,053 | 3/1976 | Kovach et al. ................... | 260/683.9 |
| 3,957,898 | 5/1976 | Girotti et al. ..................... | 260/683.9 |
| 4,038,175 | 7/1977 | Bhasin .............................. | 208/144 |

*Primary Examiner*—George Crasanakis

[57] ABSTRACT

A process for hydrogenating polymers which are derived from olefin units containing 4 carbon atoms is disclosed whereby white oils which exhibit a low iodine value (e.g., below 0.26) are obtained under relatively mild reaction conditions. The hydrogenation is effected in the presence of a catalyst comprising platinum on an alumina support exhibiting a total pore volume of at least 0.25 ml/g of which about 90 to 98% are provided by pores the mean size of which is below 100A.

13 Claims, No Drawings

HYDROGENATION PROCESS OF OLEFIN POLYMERS FOR PRODUCING WHITE OILS

BACKGROUND OF THE INVENTION

The present invention relates to a process for hydrogenating polymers derived from olefin units having 4 carbon atoms and thereby preparing products which are colorless, odorless, stable to heat and storage and which fulfill the requirements for white oils and medicinal oils.

White oils usually are mineral oils which are prepared by high purification of petroleum fractions boiling in the lubricating oil boiling range. This process usually comprises two steps: a desulfurization followed by hydrogenation under very severe operating conditions. White oils are allowed to be used in or in contact with food, only if they fulfill the official requirements for foodstuffs. The most widely applied standards are the official requirements in the U.S. regulations promulgated by the FDA, the German regulations set forth in DAB VII and the British regulations set forth in the B.P. acid test.

It has already been proposed to purify polymers which are prepared from olefin units having 4 carbon atoms, particularly polybutenes by means of a hydrogenation process, in order to obtain a colorless and substantially odorless polybutene which can be used, for example, as a substitute for natural squalane in cosmetic formulas. However, the product obtained does not come close to fulfilling the white oils requirements. Indeed, the iodine value of the hydrogenated product, which characterizes the unsaturation degree of the product, is much too high.

U.S. Pat. No. 3,100,808 teaches the hydrogenation of polybutene at a temperature of between 60° and 350° C, at a pressure of between 3.5 and 210 kg/cm² in the presence of nickel, palladium or platinum on an alumina support, but the iodine value of the hydrogenated product is higher than 1. Such an iodine value is absolutely too high in order for the hydrogenated product to fulfill the while oils requirements.

SUMMARY OF THE INVENTION

It is an object of the present invention to provide a process for producing high quality white oils, especially white oils exhibiting a relatively low iodine value.

It is a further object to provide a hydrogenation process, especially a one step process for producing such white oils from polymers derived from olefin units containing 4 carbon atoms.

It is a further object of this invention to provide a process which permits hydrogenation under relatively mild reaction conditions. It is a further object to provide such a process which allows preparation of hydrogenated products, the iodine value of which is less than 0.26.

In order to accomplish the foregoing objects, there has been provided, according to the present invention, a process for hydrogenating a liquid polymer derived from olefin units containing 4 carbon atoms which comprises the step of hydrogenating said polymer at a hydrogen pressure of between about 40 and about 120 kg/cm², and at a temperature of between about 200° and about 250° C in the presence of a catalyst comprising platinum on an alumina support exhibiting a total pore volume of at least about 0.25 ml/g, wherein about 90 to about 98% of the pore volume are provided by pores, the general size of which is distributed around a mean size lower than 100A.

The liquid hourly space velocity may be between about 0.25 and 4 l/hr$^{-1}$. A suitable hydrogen:polymer ratio is between about 250 and 6000 Nl/l. Preferably the reaction is effected under reaction conditions which are sufficient to yield a hydrogenated product, the iodine value of which is below 0.26.

It is really unexpected that such a low iodine value is achieved under such relatively mild conditions. It is well known that until now, in order to obtain low iodine values, a much higher temperature had to be applied. Moreover, such a low iodine value has never been reached by hydrogenating polybutenes in such known hydrogenation processes.

DETAILED DESCRIPTION OF PREFERRED EMBODIMENTS

The term "a liquid polymer derived from olefin units containing 4 carbon atoms" not only comprises butene polymers, but also isobutene polymers and butene and isobutene copolymers, whereby all these homopolymers and copolymers are liquid or oily products. Such polymers generally have a moleculr weight of between about 300 and 2000.

According to the known hydrogenation processes for polybutene, nickel or palladium are generally used as a catalyst. Often both these metals give better results than platinum. Moreover, in hydrogenation processes for preparing white oils from petroleum fractions, palladium is preferred to platinum as a catalyst.

The hydrogenation catalyst of the present invention comprises platinum on an alumina support. The alumina support must be a monomodal support having a total pore volume of at least 0.25 ml/g, preferably of about 0.25 to about 2.5, most preferably between 0.25 and 1 ml/g, wherein about 90 to about 98% of this total pore volume are provided by pores the general size of which is distributed around a mean size lower than 100A. Generally, the mean pore size is between about 50 and about 90A.

The mean pore sizes and the recommended percentages of pores within these size ranges are dependent upon each other and are essential operating conditions, and if either of these conditions is not met, the resulting product does not fulfill the white oils requirements as is shown in the comparative examples below.

The amount of platinum which is present in the catalyst is generally between about 0.1 and about 1.0% by weight and, more particularly, between about 0.3 and about 0.7% by weight based on the total weight of catalyst.

The catalyst composition which is used according to the present invention may be prepared according to conventional inpregnation techniques. Typically, the support material is impregnated with an aqueous solution of a soluble platinum compound. The soluble compound is used as a precursor of the metal itself and the desired metal is formed on the support by a chemical or a thermal treatment of the impregnated support material. The impregnation may also be carried out by other conventional processes according to which the support particles are impregnated with, immersed, or suspended in, or otherwise introduced into an impregnation solution in order to absorb a soluble platinum compound. On the other hand, the catalyst may be shaped in various forms and particularly in the form of granules, extrudates, cylinders, particles, beads or powder. The hydrogenation process according to the present invention may be carried out by using any catalytic hydrogenation technique, e.g., batchwise or in a continuous process and in the latter case, either a fixed bed, or a moving bed or a fluidized bed procedure may be used.

The reaction temperature and pressure at which the hydrogenation process is carried out, are dependent on each other and the above-defined ranges should be observed. Moreover, it is well known that the higher the temperature and the pressure are, the more complete the hydrogenation is, and thus the lower the iodine value of the hydrogenated product. According to the process of the present invention, polybutene may be hydrogenated at a temperature between about 200 and about 250° C and particularly between about 200° and about 230° C in order to obtain a hydrogenated product having an iodine value as low as 0.26 while the applied pressure is not very high, this pressure being about 75 kg/cm$^2$. On the other hand, a hydrogenated product having a very low iodine value may be obtained with a pressure as low as 40 kg/cm$^2$ at a temperature which does not exceed 250° C. Usually, the temperature is between about 200° and about 250° C and the pressure is between about 40 and about 120 kg/cm$^2$. Both these variables can be selected in order to obtain a hydrogenated product having an iodine value lower than or equal to 0.26. Such temperature and pressure conditions are considerably milder than those which are used in conventional processes for obtaining white oils wherein the pressure must be at least 130 kg/cm$^2$.

The other operating conditions such as the hourly space velocity of the liquid and the hydrogen:polymer ratio also have an influence on the iodine value and therefore on the degree of hydrogenation of the resulting product, but this influence is not so important as that due to temperature or pressure. Generally the space velocity of the liquid is between about 0.25 and about 4 hr$^{-1}$ and particularly between about 0.5 and about 2 hr$^{-1}$. The hydrogen:polymer ratio usually varies between about 250 and about 6000 Nl/l and still higher ratios may be used, but without any significant advantage.

The obtained hydrogenated products have been submitted to "BP acid test", DAB VII test and F.D.A. tests in order to determine their usefulness as white oils and medicinal oils.

According to the DAB VII requirements, the product must be tested for the absorption of ultraviolet light at 275, 295 and 300 nanometers, in a cell of 1 cm size. The maximum of absorption at each wavelength must be lower than 1.6, 0.2, and 0.15, respectively.

The "BP acid test" consists of a colorimetric determination of carbonizable matters in a liquid paraffins using an extraction with sulfuric acid. The colorimetric indices according to the Lovibond scale which may not be exceeded are 2.5 in the red range and 6.5 in the yellow range, when the experiments are performed in a cell of 10 mm size.

The F.D.A. test consists of three tests, the first of which concerns the determination of the carbonizable matters according to a colorimetric method. The colorimetric indices according to the Lovibond scale which may not be exceeded are 2.1 in the red range and 9 in the yellow range. The second test concerns the analysis of the sulfurized products and the third consists of the determination of the absorbance of ultraviolet light of the extract with D.M.S.O. of the test product, whereby this absorbance must not exceed 0.1 at wavelengths of between 260 and 350 nanometers when the experiment is performed in a cell of 1 cm size.

The following examples are given in order to better illustrate the features and advantages of the present invention but without limiting it.

EXAMPLE 1

A hydrogenation catalyst the support of which consists of alumina beads having a diameter 1.5 mm, is prepared. The specific surface is 209 m$^2$/g. The total pore volume is 0.51 ml/g, and 0.50 ml/g, or 98% of this total pore volume is provided by pores the size of which is distributed around a mean size of 65A.

100 g of the hereabove described alumina support is dried at 120° C and then impregnated with 100 ml of an aqueous solution of chloroplatinic acid containing 3 g of chloroplatinic acid. After 1 hour of impregnation, the catalyst is placed on a buchner funnel in order to quickly eliminate the excess of the impregnating solution. The wet catalyst is then dried at 120° C.

Thereafter, the catalyst is calcined at the air at 500° C and reduced with hydrogen at 500° C. The reduced catalyst contains 0.59% by weight of platinum.

With this catalyst, the continuous hydrogenation of a polybutene the characteristics of which are given in Table I below, is performed. (Experiments 1 and 2 of Table II).

TABLE I

| Characteristic | Method of determination | |
|---|---|---|
| Specific gravity 15/4° C | ASTM D 1298 | 0.838 |
| Viscosity | | |
| at 37.8° C (Cstokes) | ASTM D 445 | 27.34 |
| at 98.9° C (Cstokes) | ASTM D 445 | 4.88 |
| at 37.8° C (SSU) | | 127 |
| Viscosity index | ASTM D 2270 | 110–111 |
| Molecular weight | | 650 |
| Saybolt color | ASTM D 156 | +18 |
| Iodine value | IP 84 | 128.3 |

The operating conditions under which the hydrogenation is performed, and the properties of the hydrogenated product obtained in each experiment, are indicated in Table II below.

By way of comparison, hydrogenation of a polybutene the characteristics of which are described in Table I, is carried out in the presence of catalysts wherein the support of which or the metal which is deposited thereon is outside the scope of the present invention.

In a comparative experiment A, the support of the catalyst consists of alumina beads of 1.5 mm diameter, having a total pore volume of 0.87 ml/g and wherein 0.58 ml/g, or 67% of this pore volume, is provided by pores the size of which is distributed around a mean size of 200A. Platinum is deposited on this support according to a known process and the final catalyst contains 0.78% by weight of platinum.

In a comparative experiment B, the support of the catalyst consists of alumina granules having a total pore volume of 0.40 ml/g and wherein 0.25 ml/g, or 62% of this pore volume is provided by pores the size of which is distributed around a mean size of 60A. Palladium is deposited on this support according to a known process, and the final catalyst contains 0.55% by weight of palladium.

In a comparative experiment C, a catalyst is tested the support of which consists of alumina granules having a total pore volume of 0.58 ml/g and wherein 0.53 ml/g, or 91% of this pore volume, is provided by pores the size of which is distributed around a mean size of 55A.

Palladium is deposited on this support according to a known process and the final catalyst contains 0.6% by weight of palladium.

In a comparative experiment D, the hydrogenation is carried out in the presence of 10% by weight of black palladium.

The operating conditions under which the comparative experiments A, B, C and D are carried out and the properties of the resulting hydrogenated products are indicated in Table II below.

TABLE II

| Characteristic | Experiment 1 | 2 | A | B | C | D |
|---|---|---|---|---|---|---|
| Temperature (° C) | 230 | 200 | 200 | 230 | 230 | 200 |
| Liquid Space velocity(hr$^{-1}$) | 1 | 1 | 1 | 1 | 1 | 1 |
| Pressure(kg/cm$^2$) | 100 | 75 | 75 | 100 | 100 | 75 |
| Hydrogen: Polymer ratio (N1/1) | 300 | 300 | 300 | 300 | 300 | 300 |
| Specific gravity 15/4° C | 0.838 | 0.838 | 0.838 | 0.838 | 0.838 | 0.838 |
| Viscosity at 37.8° C(Cstokes) | 27.34 | 27.34 | 27.34 | 27.34 | 27.34 | 27.34 |
| at 98.9° C(Cstokes) | 4.88 | 4.88 | 4.88 | 4.88 | 4.88 | 4.88 |
| at 37.8° C(SSU) | 127 | 127 | 127 | 127 | 127 | 127 |
| Viscosity Index | 110-111 | 110-111 | 110-111 | 110-111 | 110-111 | 110-111 |
| Saybolt color | +30 | +30 | +30 | +30 | +30 | +27 |
| Iodine value | 0.12 | 0.26 | 0.78 | 3.5 | 1.8 | 10 |
| BP acid test | conform | conform | | | not conform | |
| | [1.5R [3.6Y | [2.5R [6.5Y | | | | |
| DAB VII -UV absorption cell.1cm 275 nm | 0.05 | 0.12 | 0.15 | 0.5 | 0.2 | not conform |
| 295 nm | 0.01 | 0.02 | 0.03 | 0.07 | 0.05 | |
| 300 nm | 0.01 | 0.01 | 0.02 | 0.04 | 0.03 | |
| FDA -sulfurized compounds | | | | conform | | |
| -polynuclear aromatics cell 1 cm 260-350 mm | | | | conform | | |
| USP acid test | conform | | not conform | | | |
| | [1.4R [3.6Y | [2.1R [8.5Y | (R=Red range on the Lovinbond scale.) (Y=Yellow range on the Lovinbond scale.) | | | |
| Odor | | odorless | unsatisfactory | | | |

EXAMPLE 2

The process described in Example 1 is repeated in order to obtain a catalyst containing 0.64% by weight of platinum on a support consisting of alumina beads having a total pore volume of 0.53 ml/g and wherein 0.49 ml/g or 92% of this pore volume is provided by pores the size of which is distributed around a mean size of 70A.

With this catalyst, the hydrogenation of polybutene the characteristics of which are given in the here Table III below, is carried out.

TABLE III

| Characteristic | Determination method | |
|---|---|---|
| Specific gravity 15/4° C | ASTM D. 1248 | 0.831 |
| Viscosity at 98.9° C (SSU) | | 1067 |
| Iodine value | IP 84 | 60 |
| Saybolt color | ASTM D. 156 | + 18 |

The operating conditions under which the hydrogenation is carried out and the properties of the resulting hydrogenated product are indicated in Table IV below.

TABLE IV

| Temperature | 240° C |
|---|---|
| Pressure | 115 k/cm$^2$ |
| Liquid hourly space velocity | 1 hr$^{-1}$ |
| Hydrogen: Polymer ratio | 500 N1/1 |
| Iodine value | 0.16 |
| Saybolt color | +30 |
| BP acid test | conform |

TABLE IV-continued

| | |
|---|---|
| | [ 1.6R 4.1Y |
| DAB VIII - UV absorption | |
| Cell 1 cm 275 nm | 0.05 |
| 295 nm | 0.01 |
| 300 nm | 0.01 |
| FDA | |
| -Sulfurized compounds | conform |
| -polynuclear aromatics cell 1 cm - 260 -350 nm | conform |

EXAMPLE 3

The catalyst described in Example 1 is used to hydrogenate a polybutene, the characteristics of which are indicated in Table III of Example 2. The hydrogenation is carried out under the following operating conditions:

| Temperature | 230° C |
|---|---|
| Pressure | 100 kg/cm$^2$ |
| Liquid hourly space velocity | 2 hr$^{-1}$ |
| Hydrogen: Polymer ratio | 5000 N1/1 |

The properties of the resulting hydrogenated product are the following:

| Saybolt color | +30 |
|---|---|
| Iodin value | 0.20 |
| BP acid test | conform |
| | [ 1.7R 4.2Y |
| DAB VII - UV absorption cell 1 cm 275 nm | 0.1 |
| 295 nm | 0.02 |
| 300 nm | 0.01 |
| FDA | |
| -Sulfurized compounds | conform |
| -polynuclear aromatics cell 1 cm - 260-350 nm | conform |
| -USP acid test | conform |

-continued

| | |
|---|---|
| | [ 1.9R<br>6.5Y |
| Odor | Odorless |

EXAMPLE 4

According to the process described in Example 1 there is prepared a catalyst containing 0.44% by weight of platinum on the same support as that described in Example 1 and consisting of alumina beads having a total pore volume of 0.51 ml/g wherein 0.50 ml/g or 98% of this total pore volume is provided by pores the size of which is distributed around a mean size of 65A.

With this catalyst, hydrogenation of the polybutene the characteristics of which are described in Table I of Example 1, is carried out under the following operating conditions:

| | |
|---|---|
| Temperature | 230° C |
| Pressure | 50 kg/cm$^2$ |
| Liquid hourly space velocity | 0.5 hr$^{-1}$ |
| Hydrogen | 5000 Nl/l |

The properties of the resulting hydrogenated product are the following:

| | |
|---|---|
| Saybolt color | +30 |
| Iodine value | 0.24 |
| "BP acid test" | conform |
| | [ 2.2R<br>6.5Y |
| DAB VII - UV absorption | |
| cell 1 cm 275 nm | 0.12 |
| 295 nm | 0.02 |
| 300 nm | 0.01 |
| FDA | |
|   -Sulfurized compounds | conform |
|   -Polynuclear aromatics | |
|     cell 1 cm 260–350 nm | conform |
|   -USP acid test | conform |
| | [ 2.1R<br>7.0Y |
| Odor | Odorless |

The polybutenes which are hydrogenated according to the process of the present invention, are characterized by a remarkable heat and storage stability.

The product obtained in experiment 1 of Example 1 is heated at 200° C during 48 hours. After these 48 hours of heating, the product is odorless and has a Saybolt color of +30.

The product which is obtained in experiment 1 of Example 1 is introduced into a steel vessel. The vessel is closed and stored at room temperature.

After one week, the product is still odorless and its Saybolt color is +30.

While the invention has now been described in terms of certain preferred embodiments, and exemplified with respect thereto, the skilled artisan will appreciate that various modifications, changes, substitutions, and omissions may be made without departing from the spirit thereof. Accordingly, it is intended that the scope of the present invention be limited solely by that of the following claims.

What is claimed is:

1. A process for hydrogenating a liquid polymer derived from olefin units containing 4 carbon atoms, which comprises the step of hydrogenating said polymer at a hydrogen pressure of between about 40 and about 120 kg/cm$^2$ and at a temperature of between about 200° and about 250° C in the presence of a catalyst comprising platinum on an alumina support exhibiting a total pore volume of at least about 0.25 ml/g, wherein about 90 to about 98% of said pore volume is provided by pores having a pore size distribution lower than 100A.

2. The process as defined in claim 1, wherein the liquid hourly space velocity is between about 0.25 and 4 l/hr$^{-1}$.

3. The process as defined in claim 1, wherein the hydrogen:polymer ratio is between about 250 and 6,000 Nl/l.

4. The process as defined in claim 1, wherein the total pore volume of the alumina support is from about 0.25 ml/g to about 2.5 ml/g.

5. The process as defined in claim 1, wherein the polymer is selected from the group consisting of butene polymers, isobutene polymers and copolymers of butene and isobutene.

6. The process as defined in claim 5, wherein the molecular weight of the polymer is between about 300 and 2,000.

7. The process as defined in claim 1, wherein the catalyst contains between about 0.1 and about 1.0% by weight of platinum.

8. The process as defined in claim 7, wherein the catalyst contains between about 0.3 and about 0.7% by weight of platinum.

9. The process as defined in claim 1, wherein the catalyst support comprises monomodal alumina wherein the mean pore size is between about 50 and about 90A.

10. The process as defined in claim 9, wherein the shape of the catalyst support is an extrudate in the form of cylinders.

11. The process as defined in claim 9, wherein the catalyst support is a powder.

12. The process as defined in claim 9, wherein the catalyst is a granulate.

13. The process as defined in claim 9, wherein the catalyst support is in the form of beads.

* * * * *